Figure 1A:
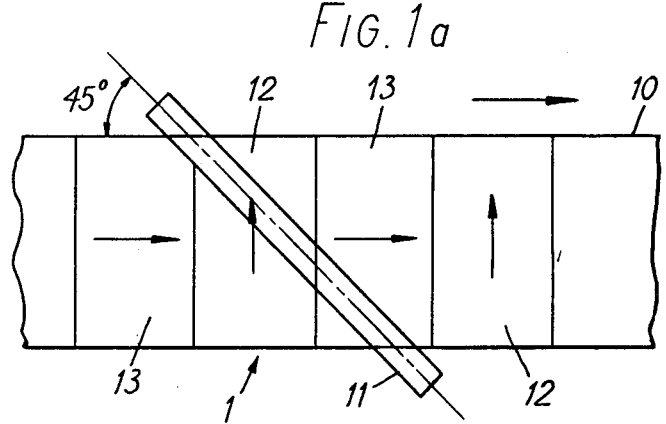

United States Patent [19]

Lee

[11] 4,023,204
[45] May 10, 1977

[54] MAGNETIC RECORDING

[75] Inventor: Cyril Arthur Lee, Maidenhead, England

[73] Assignee: EMI Limited, Hayes, England

[22] Filed: Oct. 15, 1975

[21] Appl. No.: 622,514

[30] Foreign Application Priority Data
Oct. 16, 1974 United Kingdom ............ 44749/74

[52] U.S. Cl. ..................... 360/56; 235/61.12 M; 360/2
[51] Int. Cl.² ................. G11B 5/02; G06K 19/06; G11B 25/04
[58] Field of Search ............ 235/61.11 D, 61.12 M; 360/2, 5, 25, 56, 55

[56] References Cited
UNITED STATES PATENTS

| 3,571,799 | 3/1971 | Coker, Jr. et al. | 235/61.11 D |
| 3,743,134 | 7/1973 | Constable et al. | 235/61.11 D |
| 3,873,975 | 3/1975 | Miklos et al. | 235/61.11 D |
| 3,878,367 | 4/1975 | Fayling et al. | 235/61.12 M |

Primary Examiner—Daryl W. Cook
Attorney, Agent, or Firm—Fleit & Jacobson

[57] ABSTRACT

Magnetic record media including permanent structures of aligned acicular particles have been proposed as a means of identifying and authenticating a medium. A method of recording and reading out information on such media without interference from the permanent structure remanence variation is described. Suitable forms of magnetic record media and their manufacture are described. The use of the media and method for security documents such as credit cards is also described.

10 Claims, 4 Drawing Figures

MAGNETIC RECORDING

The present invention relates to a magnetic recording method and media therefor.

According to the invention there is provided a method of recording information on an elongate magnetic recording medium including a layer of magnetically anisotropic particles which are permanently aligned with their easy axes of magnetisation in adjacent areas of the medium predominately on a respective one of two inclined directions including providing a transport means for relative motion of the medium, along its length, and a recording head, aligning a gap of the recording head and the medium to have equal inclination to each of said directions and energising the head to create a magnetic field to magnetise the medium in accordance with information to be recorded whereby resolved components of remanent magnetism produced by adjacent areas of said equally magnetised medium in the direction in which the recording head gap is aligned are substantially equal.

The directions may be mutually perpendicular. One direction may then be parallel to the length of a magnetic tape, the head gap being at 45° to the length of the tape. One direction may be at 45° to the length of the tape and the adjacent areas may extend in this direction, the head gap being positioned perpendicular to the length of the tape.

The directions may be equally inclined to the length of the tape, the head gap being positioned perpendicular to the length of the tape, the areas extending perpendicularly to one of the directions.

The invention also provides a magnetic recording medium having a layer in which magnetically anisotropic particles in adjacent areas are aligned in two inclined directions in the plane of the layer other than parallel to and perpendicular to the line of movement of the medium.

The invention also provides that by positioning a head gap parallel to one of the inclined directions watermark information, that is a pattern of remanence variation having a permanent strcture such as is described in U.K. patent specification No. 1331604, can be detected. The detection may be of the remanence caused by recorded information or by a specific magnetisation of the medium.

The invention also provides a security document including such an elongate medium.

Figure 1B:
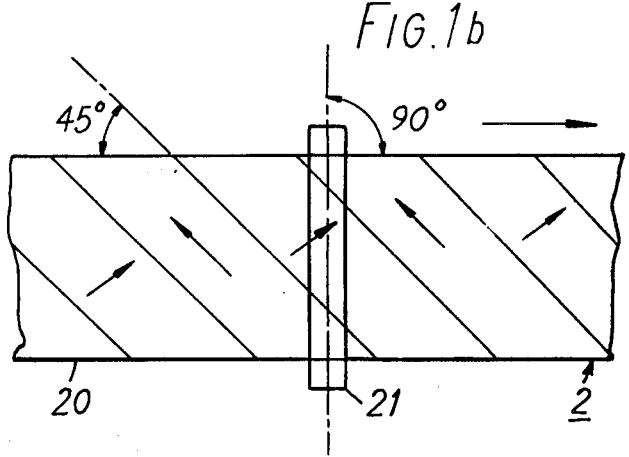
Figure 1C:
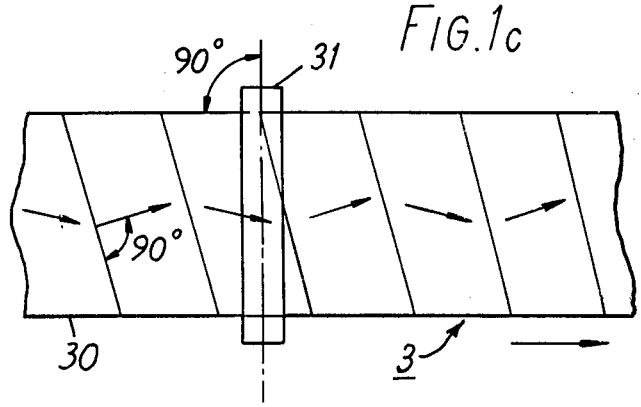
Figure 2:
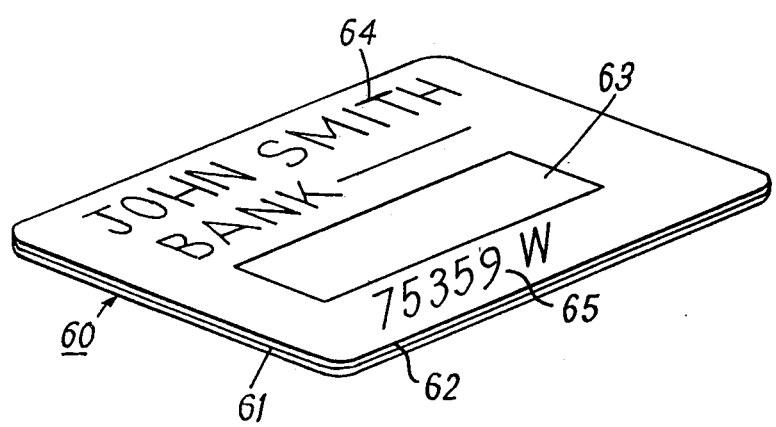

Embodiments of the invention will now be described with reference to the accompanying drawings in which:

FIG. 1a, 1b, and 1c show various forms of magnetic tape recording medium and head gap positions, and FIG. 2 shows a security document such as a credit card.

In FIG. 1a reference 1 indicates generally a magnetic recording medium in the form of a magnetic tape 10 and the position of a magnetic head 11. Tape 10 has adjacent areas in which magnetisable particles are aligned in two different oblique directions. Thus in areas marked 12 the particles are aligned perpendicularly to the length of the tape medium, which in operation is moved in one or both directions along its length as indicated by the arrow, while in areas marked 13 the particles are aligned parallel to the length of the tape. To write and read information on the tape the gap 11 in the recording or reproducing head is positioned at 45° to the length of the tape and thereby at 45° to each of the oblique directions. As a result of this positioning the remanence acquired in each area when information is written on the tape will be substantially equal resulting in a uniform recording level and similarly on reading the written information the reproduced signal will not be modulated by the watermark pattern as would be the case with the head in the normal position (i.e. perpendicular to the length of the tape).

Furthermore by positioning a head perpendicular to the tape this watermark pattern modulation can be detected as evidence of the presence of a watermark in the medium after unidirectional magnetisation of the medium or magnetisation by the recording of information. Magnetisation in either manner will result in a remanence difference signal for such a head as particles in one alignment area will be seen along their easy axis and particles the other alignment will be seen across their easy axis with a lower remanent magnetisation.

In FIG. 1b reference 2 indicates an alternative arrangement in which the tape medium is specially prepared with areas inclined at 45° to the length of the tape but with mutually perpendicular directions for the particle alignments. Here with the read and write head gap in the normal position the recorded and reproduced signal will not be modulated by the "watermark". To detect the watermark a head gap positioned at an angle to the length of the tape is required.

In FIG. 1c reference 3 indicates another special form of medium. In this the areas are inclined to the tape length while the particles in adjacent areas are oppositely inclined at equal angles to the length of the tape. Such a tape can be made by initially aligning the particles at one inclination, say 20° to the length of the medium, and then selectively aligning alternate areas to the other inclination. With this medium the normal head gap position can again be used for reading and writing, the watermark modulation being insignificant as equal remanence will be detected in each area for the same recording level in each area. To detect the watermark a head aligned with one or other of the inclinations to the tape length is required.

A medium as shown at reference 1 is described in U.K. patent specification No. 1,331,604. The other mediums which are described above may be produced using conventional coating techniques to form a layer of a dispersion of, e.g. gamma $Fe_2O_3$ particles, in a suitable binder or a support and then applying magnetic fields to align the particles before the coatings set to hold the particles in place in the layer of medium. The particles are preferably of acicular form but other types having a preferred axis of magnetisation (i.e. an isotropic) may be used.

The above method and associated media is a simple and economic way of storing readily verifiable information in a secure manner for, e.g. security documents, credit cards, cheques and passes, while permitting the updating of the stored information with relatively simple magnetic recording equipment.

The media described above can be incorporated in security documents in known manner to form e.g. a credit card, 60, as shown in FIG. 2 in which a portion of media 63 is attached to a laminate of plastics layers 61, 62 and visible information applied to the card. The medium 63 will have a permanent structural pattern as described above by which it may be verified as authentic and carry revisable information, e.g. the balance outstanding on a bank account, as a magnetic recording on the layer the recording being applied as described above, having regard to the form of the pattern, to permit it to be read substantially without interference from the pattern which may be detected separately.

What we claim is:

1. A method of recording information longitudinally on an elongate magnetic recording medium including a layer of magnetically anisotropic particles which are permanently aligned with their easy axes of magnetization in adjacent areas of a pattern of areas in the medium predominately on a respective one of two mutually inclined alignment directions, including providing a transport means for relative motion of the medium, along its length, and providing a recording head having a gap, aligning a gap of the recording head with respect to the medium to pass over the pattern of areas with equal inclination to each of said alignment directions and energising the head to create a magnetic field to magnetise pattern areas of the medium of both alignment directions in accordance with information to be recorded whereby resolved components of remanent magnetism produced by adjacent areas of said magnetised medium in a direction other than an alignment direction and in which the recording head gap is aligned are substantially equal and cooperate in the recording of the information.

2. A method accoding to claim 1 in which the directions are substantially along and perpendicular to said length and the head gap is inclined at 45° to said length.

3. A method according to claim 1 in which the directions are equally inclined to said length and the head is transverse to said length.

4. A method according to claim 1 including aligning a gap of a read-out head and the medium in the same manner as the recording head and reading out information from said resolved components of remanent magnetisation.

5. A method according to claim 1 including aligning a gap of a read-out-head with one of said directions thereby to detect a remanence variation pattern formed by variation of remanence in adjacent areas on unidirectional magnetisation of the medium in one of said directions.

6. A magnetic recording medium of elongate form including a layer of magnetically anisotropic particles in which particles in adjacent areas of the layer are permanently aligned with their easy axes of magnetisation predominately in a respective one of two directions to form a pattern, the directions being inclined to one another and neither being perpendicular to or parallel to a longitudinal axis of the medium, whereby a longitudinal recording can be made on the medium and read without interference from said pattern.

7. A medium according to claim 6 in which the directions are inclined equally to a longitudinal axis of the medium and lie in the plane of the layer at between 20° and 45° to the axis.

8. A security document including a magnetic recording medium of elongate form and including a layer of magnetically anisotropic particles in which particles in adjacent areas of the layer are permanently aligned with their easy axes of magnetisation predominately in a respective one of two directions, the directions being inclined to one another and neither being perpendicular or parallel to a longitudinal axis of the medium, the areas forming a permanent pattern providing verification for said document the layer also providing a medium for the recording of information on the document which information is readable substantially without interference from said pattern.

9. A method of making a magnetic recording medium including providing an elongate support and a supply of a dispersion of magnetically anisotropic particles in a settable binder, coating a layer of said dispersion on said support, causing particles in said layer to adopt a first alignment of their easy axis of magnetisation other than directly along or directly across the support, causing particles in selected areas of said layer to adopt a second alignment of their easy axis of magnetisation other than directly along or directly across the support and of equal and opposite inclination to the length of the support to the inclination of the first alignment, causing the binder to set to fix the particles in their respective alignments and form a layer of magnetic record medium on the support.

10. A method according to claim 9 including aligning the particles to have predominately said first alignment and realigning particles in the selected areas to have predominately the second alignment.

* * * * *